United States Patent [19]

Taguchi et al.

[11] Patent Number: 5,335,749
[45] Date of Patent: Aug. 9, 1994

[54] CRASH SENSOR

[75] Inventors: Masahiro Taguchi, Hazu; Motonori Tominaga, Okazaki; Toshiaki Matsuhashi, Gamagori; Koichi Fujita, Nagoya, all of Japan

[73] Assignees: Nippondenso Co., Ltd., Kariya; Nippon Soken, Inc., Nishio; Toyota Jidosha Kabushiki Kaisha, Toyota, all of Japan

[21] Appl. No.: 928,474

[22] Filed: Aug. 12, 1992

[30] Foreign Application Priority Data

Aug. 13, 1991 [JP] Japan .................. 3-228460

[51] Int. Cl.⁵ ............................................. H01H 35/14
[52] U.S. Cl. .................................... 180/274; 280/735
[58] Field of Search ................... 280/730 A, 735; 180/274; 200/61.43, 61.44; 296/146 C

[56] References Cited

U.S. PATENT DOCUMENTS

| 2,592,742 | 4/1952 | Rose | 200/61.44 |
| 4,977,388 | 12/1990 | Park | 200/61.44 |
| 5,080,188 | 1/1992 | Okuhara | 280/735 |
| 5,172,790 | 12/1992 | Ishikawa | 280/735 |

FOREIGN PATENT DOCUMENTS

| 1380968 | 1/1975 | European Pat. Off. . |
| WO9006247 | 6/1990 | European Pat. Off. . |
| 1945621 | 3/1971 | Fed. Rep. of Germany . |
| 2643505 | 3/1978 | Fed. Rep. of Germany ... 200/61.43 |
| 3716168 | 11/1988 | Fed. Rep. of Germany . |
| 9006247 | 6/1990 | Fed. Rep. of Germany . |
| 2671525 | 1/1991 | France . |
| 62-28655 | 2/1987 | Japan . |
| 2225660 | 6/1990 | United Kingdom . |
| 420494 | 4/1991 | United Kingdom . |
| 2243933 | 11/1991 | United Kingdom . |

*Primary Examiner*—Karin L. Tyson
*Attorney, Agent, or Firm*—Cushman, Darby & Cushman

[57] ABSTRACT

A crash detection sensor having a supporting member arranged in a space in a door. The supporting member has sufficient strength to maintain its state under normal conditions. First and second electrodes, usually spaced, are provided on the supporting member. A shock larger than a predetermined level applied to the door causes the first and the second electrodes to be brought into contact with each other, thereby allowing a lateral impact to be detected in the door.

3 Claims, 9 Drawing Sheets

CRASH SENSOR

BACKGROUND OF THE INVENTION

1. Field of the Invention

The present invention relates to a sensor for detecting a crash that is typically used for an air bag that is for protecting a passenger during an automobile accident particularly at the side of the automobile.

2. Background of the Invention

A system has recently been proposed which, in addition to a seat belt device, is provided with an air back device for the protection of a passenger during an accident. The conventional air bag device is mainly directed to the protection of a passenger upon a head-on collision, wherein it is provided with an air bag arranged in the steering wheel column or instrumental panel in front of the driver or passenger which, upon the occurrence of an accident the air bag inflates and occupies a space to cushioning the person therein.

In addition to the above mentioned usual type of air bag for the protection of a passenger during a head on collision, another type of air bag device has been proposed for the protection of a passenger during impact from the side of the vehicle, wherein the air bag device is usually stored in a side door or side wall of the vehicle body. During an accident, an air bag stored in the side door or side wall is inflated so that it occupies the space between the passenger and the side door or wall for protection thereat. In order to detect the occurrence of a lateral impact a sensor in the vehicle that responds to said impact is provided.

However, the prior art crash sensor is ineffective at high speed and cannot accurately detect lateral impact. Consequently there is a demand for a sensor capable of attaining the above function.

SUMMARY OF THE INVENTION

The present invention aims to provide a sensor capable of a quick and precise detection of a lateral impact.

According to the present invention, a crash sensor to be attached to a door of an automobile is provided, the door having a space extending along a width of the door, and said crash sensor comprising:

- a supporting member extending along the width of the door in said space; said supporting member having axially spaced ends;
- means for mechanically connecting the supporting member to respective portions of the door;
- said supporting member having sufficient rigidity for the supporting member to maintain its original state without being displaced under normal conditions, and;
- means for detecting a shock occurring in the supporting member during an accident and producing a signal indicating the occurrence of an impact.

According to the present invention, a lateral impact causes the shock to be transmitted to the supporting member via the door. The shock generates a deformation or displacement of the supporting member, which generates a signal that indicates an impact has occurred.

BRIEF DESCRIPTION OF ATTACHED DRAWINGS

FIG.. 1 is a side view of a door of an automobile, partly broken to illustrate how a supporting member (cylindrical beam) is arranged in a space of a door.

FIG.. 2 is a cross sectional view taken along line II—II in FIG. 1.

FIG. 3 is a cross sectional view taken along line III—III in FIG. 1.

FIG. 4-(A) is an enlarged view of FIG. 3 at location indicated by a circle (a) under normal conditions.

FIG. 4-(B) is similar to FIG. 4-(A), but shows when a lateral impact has occurred.

FIG. 5 As a cross sectional view taken along line V—V in FIG. 4-(A). FIG. 6 is a diagrammatic view of an electric circuit for operating an air bag apparatus in which according to the present invention brash sensors in respective doors of the automobile are placed.

FIG. 7 is similar to FIG. 3, but is directed to a second embodiment of the present invention.

FIG. 8-(A) is an enlarged view of FIG..7 at a location indicated bye circle (b) under normal conditions.

FIG. 8-(B) is similar to FIG. 8-(A), but shows when a lateral impact has occurred.

FIG. 9 is similar to FIG. 3, but is directed to a third embodiment of the present invention.

FIG. 10-(A) is an enlarged view of FIG. 9 at a location indicated by a circle (c) under normal conditions.

FIG. 10-(B) is similar to FIG. 10-(A), but shows when a lateral impact has occurred.

FIG. 11 is a cross sectional view taken along lane XI—XI in FIG. 10-(A).

FIG. 12-(A) shows a longitudinal cross sectional view of a fourth embodiment of the present invention.

FIG. 12-(B) is similar to FIG. 12-(A), but shows when a lateral impact has occurred.

FIG. 13-(A) illustrates a relationship between the time and amount of light as received by the receiver under normal conditions.

FIG. 13-(B) illustrates a relationship between the time and the amount of light as received by the receiver when a lateral impact has occurred.

DESCRIPTION OF PREFERRED EMBODIMENTS

Figure 1:
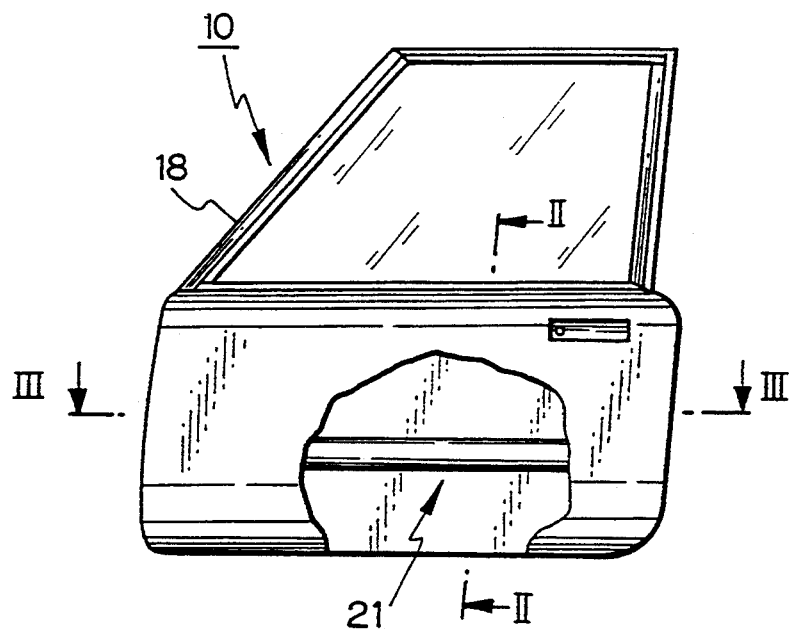
Figure 2:
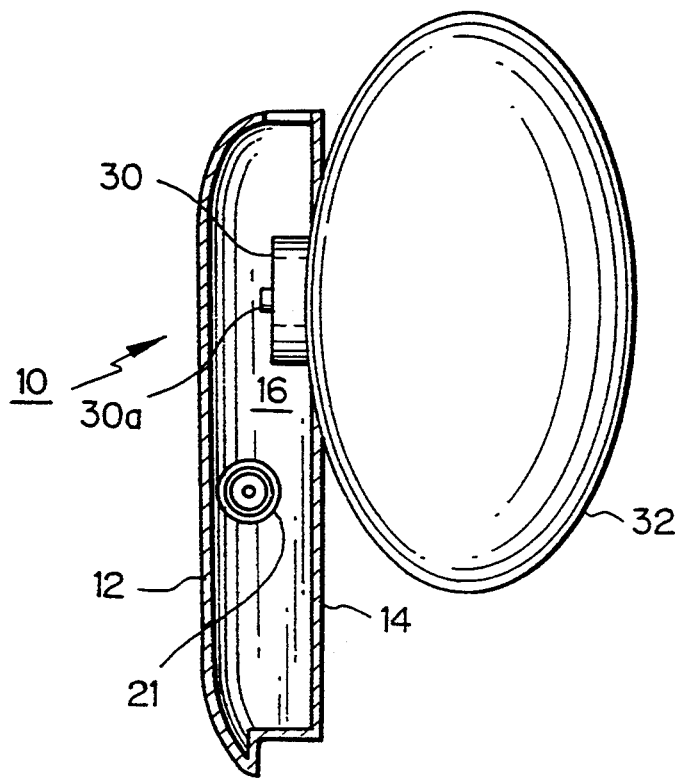
Figure 3:
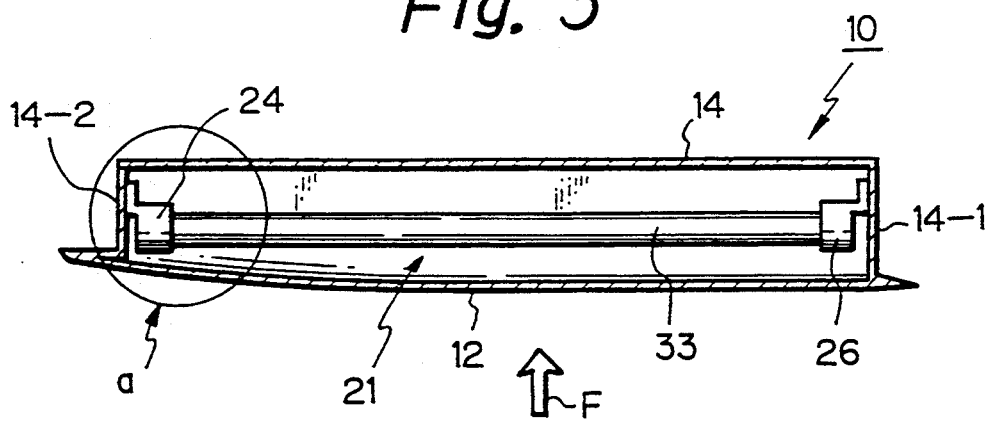

FIGS. 1 to 5 show a first embodiment of a crash sensor, according to the present invention, that is mounted in a side door of an automobile for detection of a lateral impact. In FIG. 1, a reference numeral 10 denotes, generally, a side door of an automobile, which is constructed, basically, as shown in FIG. 2, an outer panel 12 and 14 an inner panel 14 that are connected to each other at their top and bottom ends for creating a space 16 therebetween. The door assembly 10 is further provided with a window frame 18 in which a window pane 20 is arranged that is, when necessary, stored in the space 16. As shown in FIG. 3, arranged inside the door (a driver's seat door) is a first crash sensor 21 in the shape of a rod extending inside the door 10 and across the space horizontally along the width of the door 10. The crash sensor has opposite ends connected to the inner panel 14 at their end portions 14-1 and 14-2 by means of respective stays 24 and 26 that are connected to the portions 14-1 and 14-2, respectively by welding.

As shown in FIG. 2, an inflator device 30 is arranged in the space 16 inside the door assembly 10. The inflator device 30 is provided with an air bag 32 that is, in FIG.

2, shown in its inflated state and occupying a space between the door 10 and the lateral side of a passenger (not shown) during an accident for protection thereat. As is also well known, the inflator device 30 has an ignition plug 30a for igniting material (not shown) in the inflator device 30 upon the occurrence of an impact. The inflator device 30 is further filled with gas generating material that generates a flow of a large amount of nitrogen gas upon ignition of the igniting material by the ignition plug 30a to thereby inflate the bag 32.

Figure 4A:
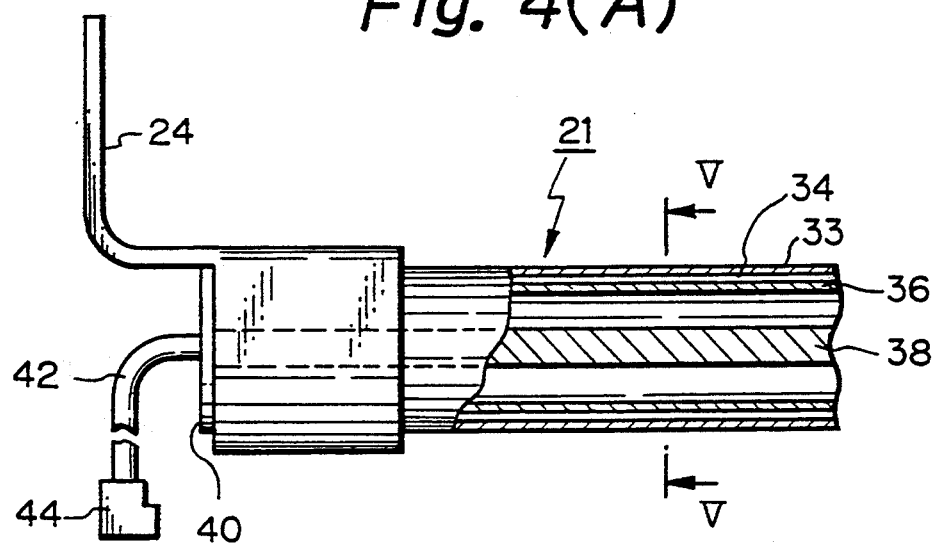
Figure 4B:
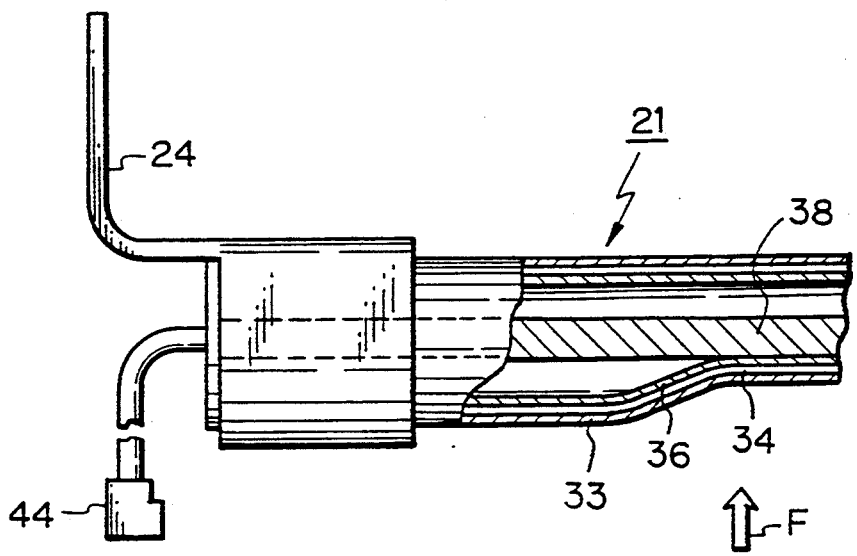
Figure 5:
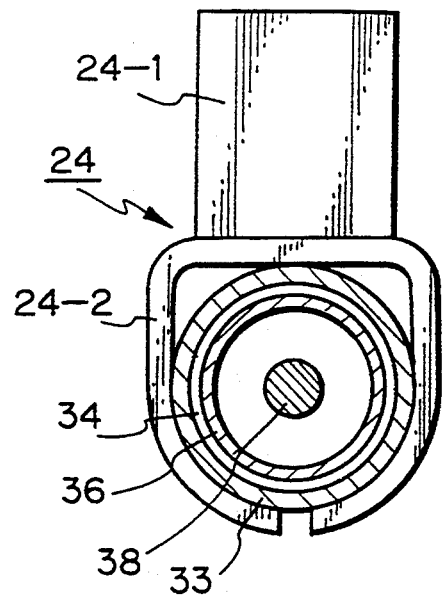

In FIG. 4, which shows a detailed portion as circled by (a) in FIG. 3, the first crash sensor 21 includes a beam 33 that forms a cylindrical rod shape having an inner cylindrical wall on which a layer 34 made of electric insulating material is formed. On the insulating layer 34, a layer 36 as a first electrode member made of material having electric conductivity, is formed. A second electrode member 38 as a rod extends axially inside the cylindrical beam 33 along the axis thereof, so that the first and second electrodes 36 and 38 are usually spaced from each other so that electric contact does not take place therebetween. Suitable bearing members 40, only one of which is shown, are provided to support the second electrode (rod) 38 with respect to the outer beam, which prevents the electrode 38 from making electrical contact with the first electrode member (layer) 36. The second electrode 38 extends out of the cylindrical beam 33 so that it is electrically connected, via a lead wire 42, a connector 44 for connection to an outside controller circuit. As shown in FIG. 5, the stay 24 is constructed by a plate portion 24-1 connected to the door panel portion 14-2 and a supporting portion 24-2 that is integral to the plate portion 24-1 and has a substantially closed cross sectional profile in which the end of the beam 33 is inserted to allow it to be supported by the stay 24. The construction of the opposite stay 26 is substantially the same as that of the first stay 24. It should be noted that a second crash sensor (not shown) is also arranged in the passenger's seat. The second crash sensor has the same construction as the first crash sensor 21.

Figure 6:
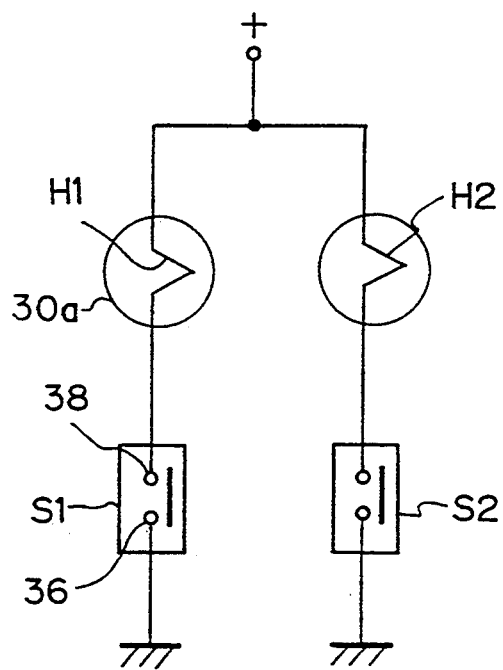

FIG. 6 generally shows an electrical connection of the air bag system. The first and second electrodes 36 and 38 for the driver's seat construct a normally closed first switch S1, which is, on one end (electrode 36), grounded, and is, on the other end (electrode 38), connected in series to a heater constructed by the first ignition plug 30a, and to a positive electrode of a battery (not shown). The sauna construction constructed by a series connection of a switch S2 and a heater H2 is also obtained for the passenger's seat.

Upon the occurrence of a lateral impact, an outside force is usually applied transverse to the door 10 as shown by an arrow F in FIG. 3, which causes the outer panel 12 to be deformed inwardly when an impact is larger than a predetermined value, so that the pipe shaped beam 33 of the sensor 21 collapses inwardly together with its insulating layer 34 and the inner layer 36 as the first electrode, which is brought into contact with the central rod 38 as the second electrode. As a result, a closed circuit is created in the heater H1 of the inflator 30a in the driver's door or the heater H2 of the inflator of the passenger's door, which causes a large amount of the nitrogen gas to be generated so as to inflate the air bag 32 as shown in FIG. 2, which occupies the space between the door and the passenger to protect and cushion the occupant from the impact during an accident.

It should be noted that, in the first embodiment, the cross sectional shape of the beam 33 constructing the sensor 21 may not necessarily be circular, and another shape, such as a rectangular shape, can be employed.

Figure 7:
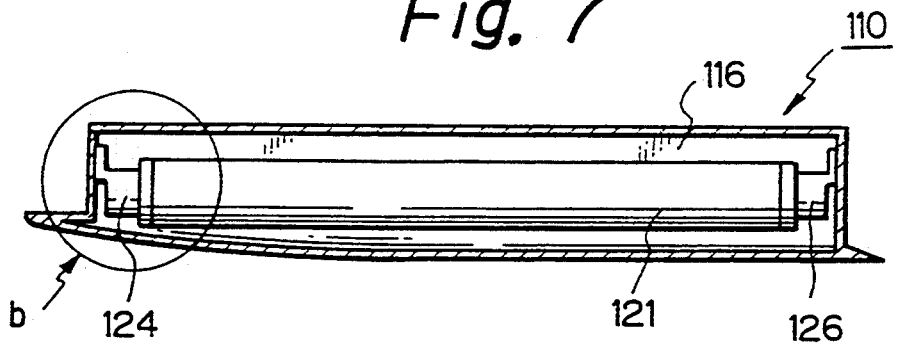
Figure 8A:
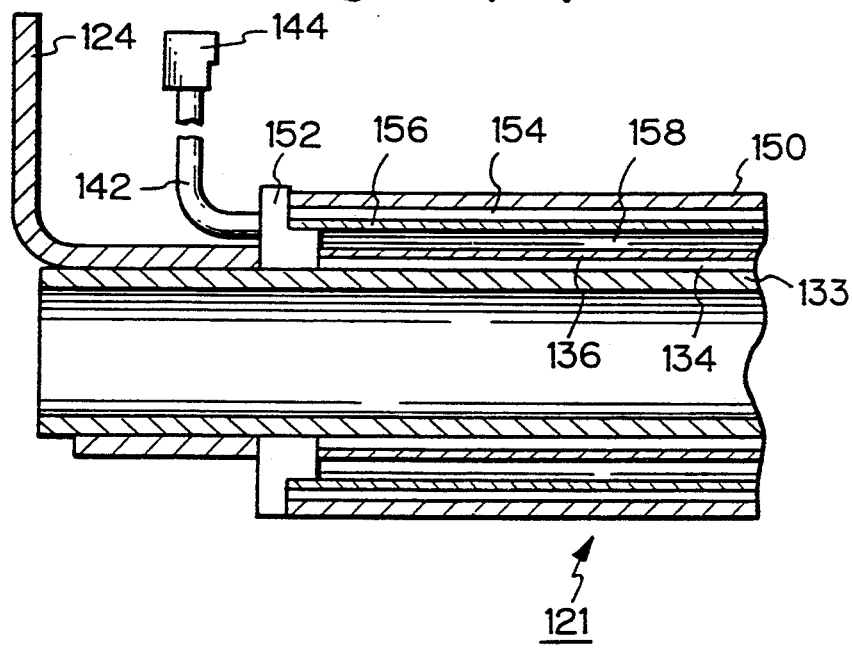
Figure 8B:
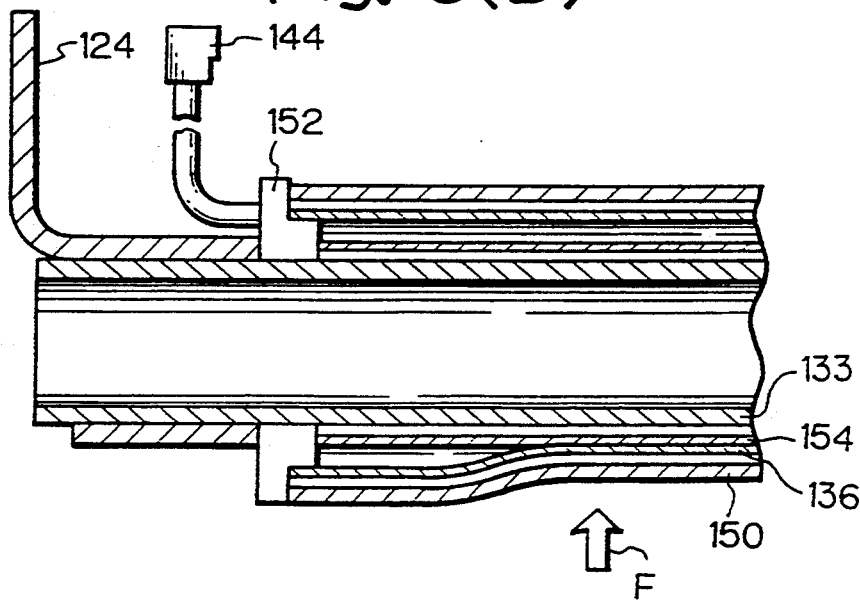

FIGS. 7 and 8 shows a second embodiment of the present invention. A crash sensor 121 is, similar to the first embodiment, elongated horizontally in a space 116 of a door 110. The crash sensor 121 includes a cylindrical beam 133 having opposite ends supported by respective panels constructing the door 110 by mesas of stays 124 and 126. An electric insulating layer 134 is formed on the outer cylindrical wall of the beam 133, and a first electrode member 136 made of material having electrical conductivity is formed on the insulating layer 134. An outer cylindrical beam 150 is arranged outwardly and coaxially with the cylindrical beam 133, and the outer cylindrical beam 150 is connected to the first cylindrical beam 133 by a pair of spaced stays 152 (only one of which is shown) that are made of electrical insulating material. Formed on the inner cylindrical wall of the outer beam 150 is a layer 154 made of electric insulating material, and a layer 156 made of a material having electric conductivity as a second electrode umber is formed on the inner surface of the electric insulating layer 154, so that an annular space 158 is formed between the inner and outer electrodes 136 and 156 as the layers made of the material having electric conductivity. The first electrode 136 is grounded, and the second electrode 156 is connected, via a lead wire 142, a connector 144 and a heater of the inflator, to a battery. It should be noted that, from the mechanical strength point of view, the outer cylindrical beam 150 is weaker than that of the inner cylindrical beam 133.

During the operation of the crash sensor 121 in the second embodiment, upon a lateral impact owing to a force in a direction transverse to the door assembly 110, as shown by an arrow F in FIG. 8-(B), the outer beam of a mechanically weaker property collapses as shown, which causes the first electrode 136 on the outer cylindrical beam to be brought into contact with the inner second electrode 156 on the inner cylindrical beam. As a result, a closed circuit is obtained in a similar way as explained with reference to FIG. 6, causing the ignition plug 30a to be energized and ignite the ignition material thereby causing the gas generating material to be generated and the air beg 32 to be inflated so as to occupy the space between the side door and the passenger to protect the same.

Figure 9:
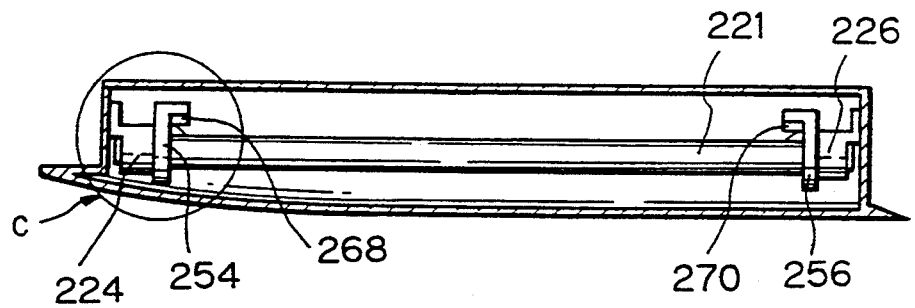
Figure 10A:
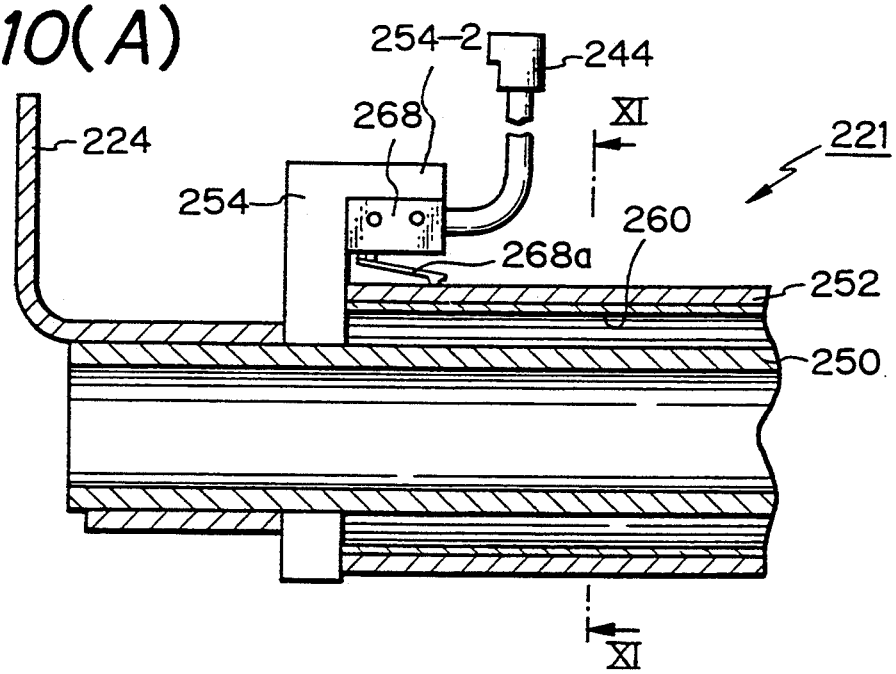
Figure 10B:
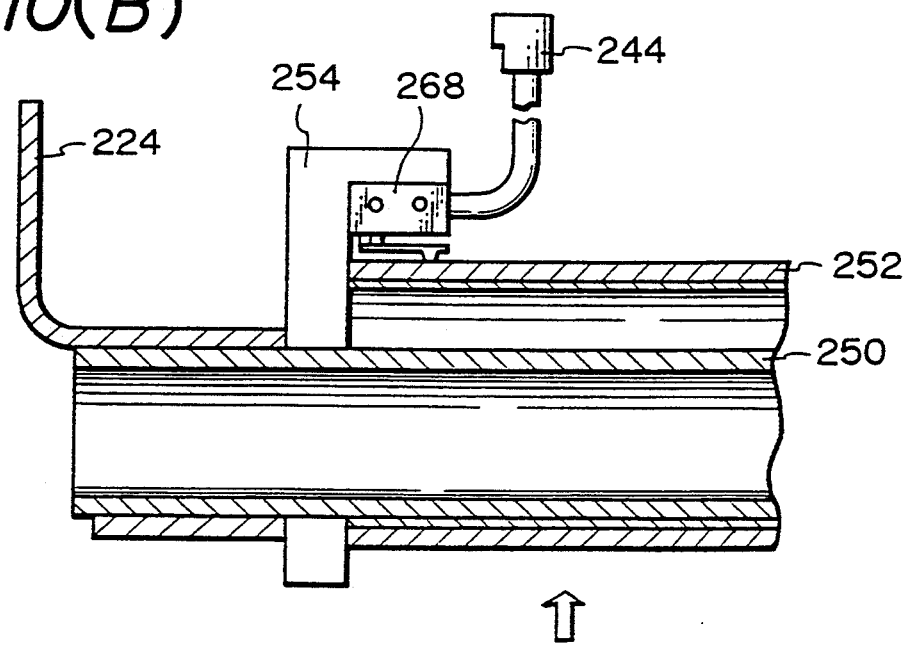
Figure 11:
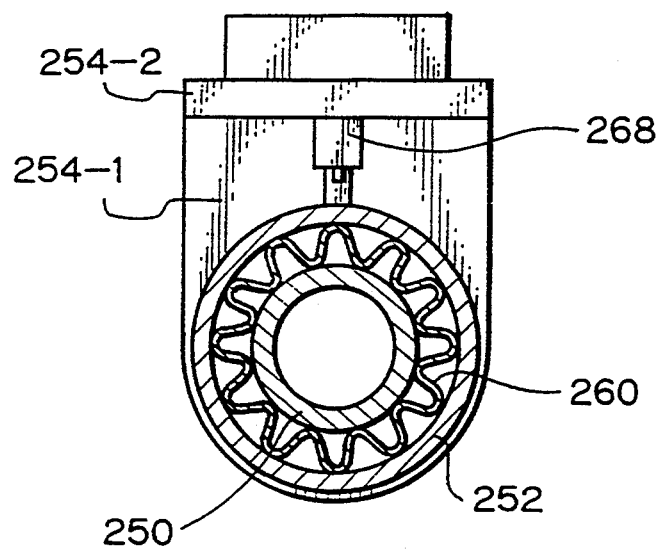

FIGS. 9 to 11 show a third embodiment of the present invention. A crash sensor 221 of the third embodiment includes an inner cylindrical beam 250 having opposite ends connected to respective stays 224 and 226, and an outer cylindrical beam 252. As shown in FIG. 11, an annular spring plate 260, An transverse cross section in a corrugated ring shape As arranged between the inner and outer cylindrical beams 250 and 252 so that they are concentric to each other. A pair of axially spaced apart stays 254 and 256 are connected to the inner beam 250 at a position near their respective ends. As shown in FIG. 11, the stay 254 is constructed from a plate portion 254-1 having a central bore through which the beam 250 is inserted and fixed thereto by a suitable means, and a horizontally extending portion 254-2 extending horizontally, integrally from the plate portion. The stay 256 has a construction substantially the same as that of the stay 254. Limit swatches 268 end 270 are fixed to the respective stay members 254 and 256 at there horizontally extending portions. The switch 268 has a feeler 268a that is in contact with the outer surface of the outer beam member 252. The switch 270 has a feeler of the same construction as that of feeler 268a of the first relay 270. The limit switches 268 and 270 have respective switch members operated by respective feelers and are connected to respective connector 244, so that an electric circuit similar to that in FIG. 6 is obtained.

A lateral impact causes the outer cylindrical beam 252 to be radially displaced with respect to the inner cylinder 250, as shown by FIG. 10-(B) because of elastic deformation of the sprang 260, which causes the feelers of the respective limit switches 268 and 270 to move upwardly, causing the switches S1 and/or S2 to be turned ON, so that a closed circuit is created via the heater H1 and/or heater H2, causing gas to be generated to inflate the air bag 32 as shown in FIG. 2 and occupy the space between the door and the passenger.

Figure 12A:
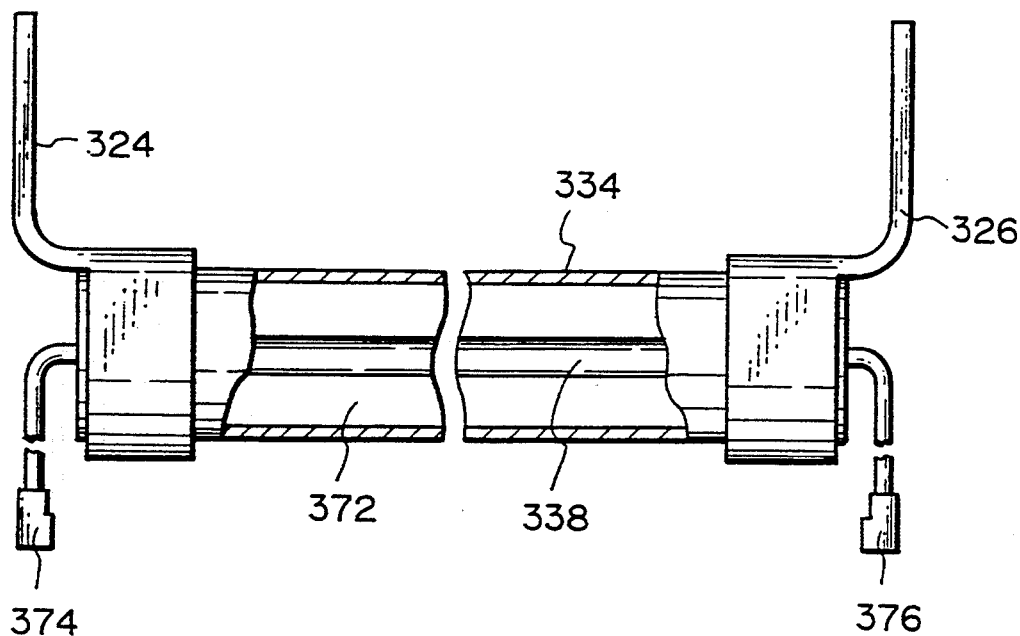
Figure 12B:
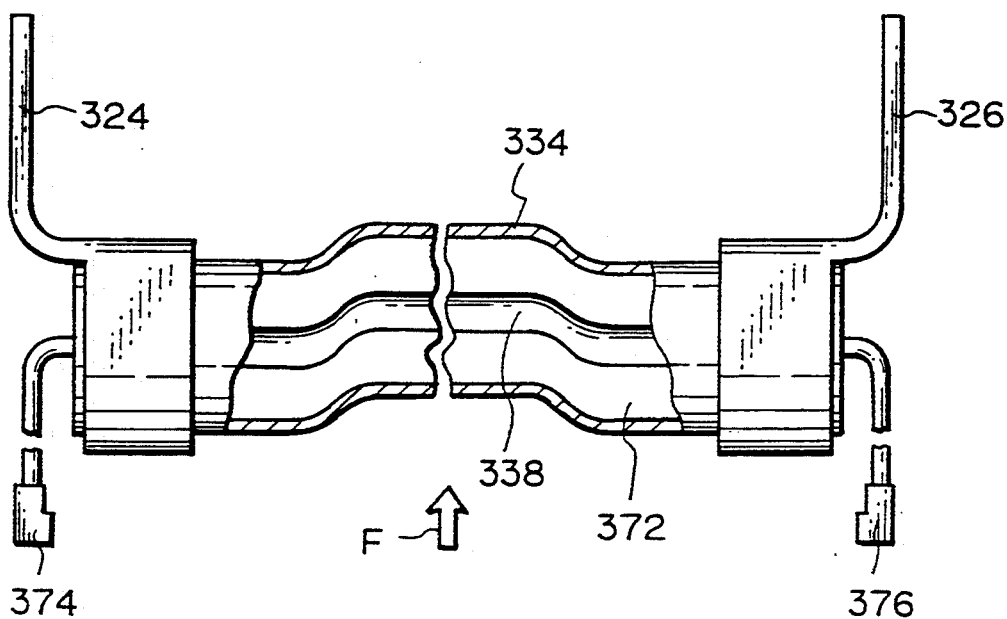

FIGS. 12-(A) and 12-(B) show a fourth embodiment of the present invention, a cylindrical beam 334 extends horizontally along the general plane of a side door in a space therein. Coaxially to the cylindrical beam 334 a fiber optic rod 338, which is flexible is arranged inside the beam 334, so that a flexible material 372 occupies the space between the cylindrical beam 334 and the fiber optic rod 338. The fiber optic rod 338 has a first end connected to a light receiving portion 374 and a second end connected to a light emitting portion 376.

Figure 13A:
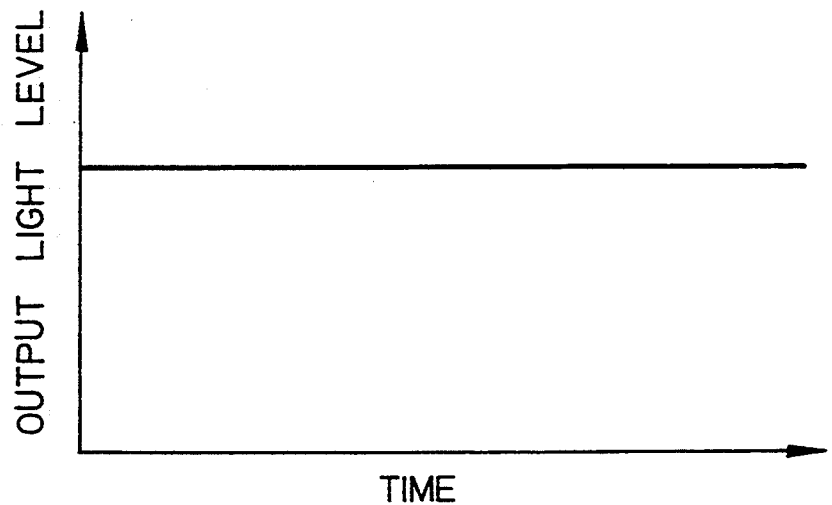
Figure 13B:
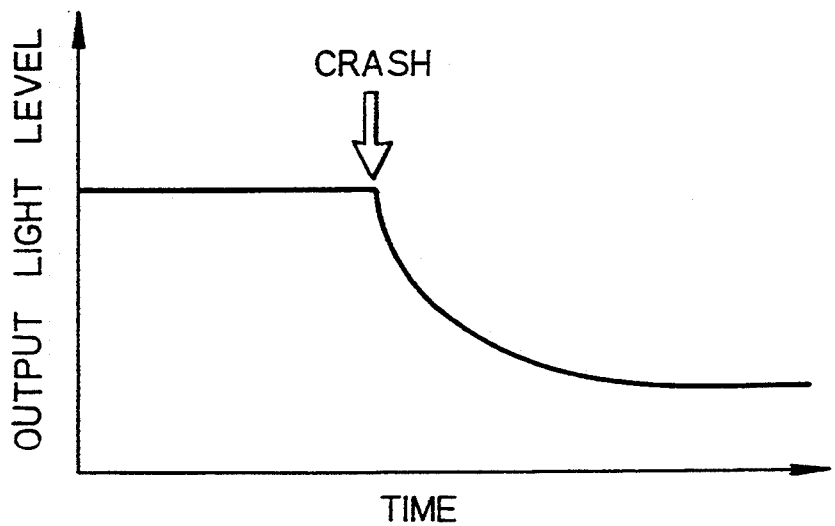

In the construction of the fourth embodiment, a lateral impact force causes a portion of the cylindrical beam 334 to laterally deform, end the optical fiber rod 338 is correspondingly laterally deformed at a location corresponding to the deformed portion of the cylindrical beam 334, as shown in FIG. 12-(B). As a result, an amount of light received at the light receiving portion 374 is correspondingly different than that obtained if the beam 334, as well as the rod 338, are not deformed as shown in FIG. 12-(A) even if the amount of the light emitted from the light emitting portion 376 does not change. FIG. 13-(A) illustrates relationship between the time and the amount of light as received By the receiver 374 before the impact, while FIG. 13-(B) illustrates a relationship between the time and the amount of the light as received by the receiver 374 after the impact. As will be easily seen from FIG. 13-(B), the impact reduces the amount of light received drastically, which makes it possible to detect the occurrence of a lateral impact which causes the air bag to be inflated.

Figure 14:
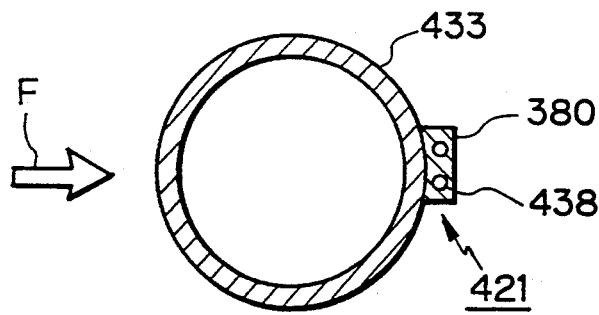
FIG. 14 is a cross sectional view in a fifth embodiment.
Figure 15:
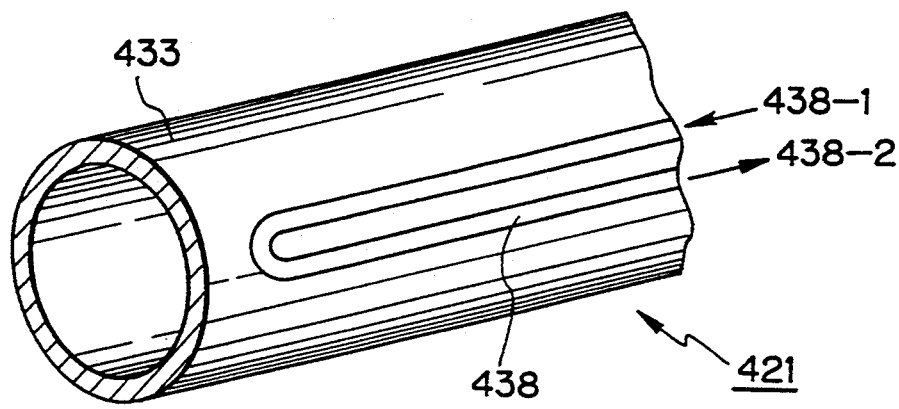
FIG. 15 is a general perspective view of the embodiment in FIG. 14.

FIGS. 14 and 15 show a fifth embodiment, where, in place of mounting the fiber optical flexible rod in cylindrical beam, a crash sensor 421 is provided with an optical fiber 438 arranged on the outer cylindrical wall of a cylindrical beam 433, which extends vertically along the space in the door along the general plane thereof, similar to the previous embodiment. Attachment of the optical fiber rod 438 to the cylindrical beam 433 is effected by suitably fixing members 380. FIG. 14 shows an arrangement of the optical fiber rod 438 on the outer surface of the beam 433, which generally forms an elongated U-shape having one end 438-1 for receiving light from a not shown source, and a second end 438-2 for receiving light transmitted through the rod 438. An impact causes the rod 433 to deform, which causes the amount of light received by the receiving end 438-2 vary irrespective of a constant input of light supplied to the inlet end 438-1. Such change in the light signal level can be used to detect an impact.

Figure 16:
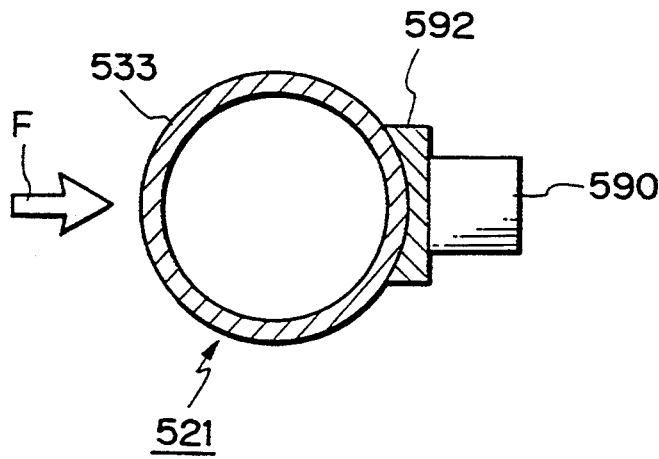
FIG. 16 shows still another embodiment in cross section.

FIG. 16 shows another embodiment, a crash sensor 521 is constructed as a G-sensor or G-switch 590 that is connected to a cylindrical beam 533, which extends vertically along the space in the door along the general plane thereof and is connected at both ends to respective portions of an inner panel thereof, similar to the previous embodiment. The G-sensor 590 is connected, by a fixing member 592, to an outer wall of the cylindrical beam 533.

A deformation or dislocation as generated in the beam 533 as a result of a lateral impact causes the acceleration applied to the beam 533 to change. A change in the acceleration larger than a predetermined value is detected by the G-switch 590, causing an ON signal to be issued and causing the inflator 30 to operate in the same way as in reference to FIG. 6 in the first embodiment. As a result, an air hag is inflated between the passenger and the door to protect the said passenger.

It should be noted that, in this embodiment, in case where a G-sensor is used, a discrimination circuit will be necessary to determine the difference between lateral impact and the force resulting from opening or closing the door. In order to accomplish this, a comparator is used to receive the signal from the G-sensor and a voltage setter is used to provide a predetermined voltage level corresponding to a level that is higher than that that would occur when received as a result of opening or closing a door. The comparator is operated only when the signal from the G-sensor is higher than the threshold level for providing a signal so as to operate the inflator.

Although embodiments are described with reference to the attached drawings, many modifications and changes can be made by those skilled An this art without departing from the scope and spirit of the present invention.

We claim:

1. A crash sensor to be attached to a door of an automobile, the door having a space extending along a width of the door; said crash sensor comprising:

a supporting member extending along the width of the door in said space; said supporting member having axially spaced ends;

means for mechanically connecting the supporting member to respective portions of the door;

said supporting member having sufficient rigidity to cause the supporting member to maintain its original state under a normal condition; and means for detecting a shock occurring in the supporting member, itself, during an impact, and producing a signal indicating the occurrence of said impact, said detecting means comprising a rigid member which extends to be coaxial with respect to the supporting member, and means for supporting the rigid member with respect to the supporting member so that they are usually spaced apart with each other, said rigid member and the supporting member having at least portions having electrical conductivity on their surfaces facing each other, which are usually spaced form each other, the occurrence of an impact allowing an electrical closed circuit to be created between the surfaces when they are brought into contact with each other upon displacement as a result of an impact occurring so as to obtain an electric signal indicating the occurrence of said impact.

2. A crash sensor according to claim 1, wherein said supporting member forms a cylindrical body having an axis of elongation, and wherein said rigid member forms a rod which is arranged inside the cylindrical supporting member so as to be coaxial with each other to create an annular space therebetween, the supporting member and the rigid member having facing annular surfaces, said portions having electrical conductivity being formed on the facing surfaces.

3. A crash sensor according to claim 1, wherein said supporting member forms a cylindrical body having an axis of elongation, and wherein said rigid member forms a cylindrical body which is arranged outside the supporting member so as to be coaxial with each other to create an annular space therebetween, the supporting member and the rigid member having facing annular surfaces, said portions having electrical conductivity being formed on the facing surfaces.

* * * * *